United States Patent
Grossetête et al.

(10) Patent No.: US 12,427,932 B2
(45) Date of Patent: Sep. 30, 2025

(54) METHOD FOR SECURING A VEHICLE COMPRISING A DISPLAY, ELECTRONIC SECURITY DEVICE AND ASSOCIATED COMPUTER PROGRAM PRODUCT

(71) Applicant: THALES, Courbevoie (FR)

(72) Inventors: Matthieu Grossetête, Mérignac (FR); Nicolas Levasseur, Mérignac (FR); Frédéric Cezilly, Mérignac (FR)

(73) Assignee: THALES, Courbevoie (FR)

( * ) Notice: Subject to any disclaimer, the term of this patent is extended or adjusted under 35 U.S.C. 154(b) by 654 days.

(21) Appl. No.: 17/536,340

(22) Filed: Nov. 29, 2021

(65) Prior Publication Data
US 2022/0176820 A1    Jun. 9, 2022

(30) Foreign Application Priority Data
Dec. 4, 2020    (FR) ...................... 20 12686

(51) Int. Cl.
*B60K 35/60*    (2024.01)
*B60K 35/00*    (2024.01)
(Continued)

(52) U.S. Cl.
CPC .............. *B60K 35/60* (2024.01); *B60K 35/00* (2013.01); *B60R 11/04* (2013.01); *B60K 35/28* (2024.01); *B60K 35/29* (2024.01); *B60K 2360/165* (2024.01); *B60K 2360/176* (2024.01); *B60K 2360/195* (2024.01); *B60K 2360/48* (2024.01)

(58) Field of Classification Search
CPC ........ B60K 35/60; B60K 35/00; B60K 35/28; B60K 35/29; B60K 2360/165; B60K 2360/176; B60K 2360/195; B60K 2360/48; B60K 35/22; B60K 35/10; B60R 11/04; G09G 2340/10; G09G 5/14; G09G 5/377; G09G 2360/16; G09G 2380/10; G09G 2380/12; H04N 21/2187; G06F 3/14
See application file for complete search history.

(56) References Cited

U.S. PATENT DOCUMENTS 9,669,761 B2    6/2017  Lee
2014/0375704 A1*  12/2014  Bi ........................ G09G 3/3275
                                              345/694
(Continued)

FOREIGN PATENT DOCUMENTS

JP        4727610 B2  *  7/2011

OTHER PUBLICATIONS

English translation of JP-4727610-B2. https://worldwide.espacenet.com/patent/search/family/039908591/publication/JP4727610B2?q=jp4727610 (Year: 2011).*

(Continued)

*Primary Examiner* — Farzana Hossain
(74) *Attorney, Agent, or Firm* — ArentFox Schiff LLP

(57) ABSTRACT

The object of the invention is a method for securing a vehicle comprising a critical system including a display, the method comprising the following steps:
acquisition of at least one video stream to be shown on the display;
calculation of a brightness level of the or each video stream;
if the brightness level of the video stream(s) meets a predefined criterion, then the video stream is displayed on the display;
otherwise, display of the video stream is inhibited.

12 Claims, 2 Drawing Sheets

(51) Int. Cl.
*B60K 35/28* (2024.01)
*B60K 35/29* (2024.01)
*B60R 11/04* (2006.01)

(56) References Cited

U.S. PATENT DOCUMENTS

| | | | |
|---|---|---|---|
| 2015/0092047 A1 | 4/2015 | Ryu | |
| 2015/0278615 A1* | 10/2015 | Ogawa | H04N 7/183 |
| | | | 348/148 |
| 2015/0360612 A1* | 12/2015 | Lee | H04N 5/57 |
| | | | 348/148 |
| 2018/0165814 A1* | 6/2018 | Gulati | G06T 7/001 |
| 2023/0305299 A1* | 9/2023 | Xu | G02B 5/26 |

OTHER PUBLICATIONS

Nixon et al. Feature Extraction &Image Processing for Computer Vision https://www.sciencedirect.com/topics/engineering/gray-level-image. 3rd Ed. Ch 13, pp. 541-600 https://www.sciencedirect.com/science/article/pii/B9780123965493000197 (Year: 2012).*
French Search Report, from the French Patent Office in counterpart French Application No. 2012686, dated Aug. 31, 2021.

* cited by examiner

METHOD FOR SECURING A VEHICLE COMPRISING A DISPLAY, ELECTRONIC SECURITY DEVICE AND ASSOCIATED COMPUTER PROGRAM PRODUCT

CROSS-REFERENCE TO RELATED APPLICATIONS

This application claims priority to French Application No. 20 12686, filed on Dec. 4, 2020. The disclosure of the priority application is incorporated in its entirety herein by reference.

The present invention relates to a method for securing a vehicle comprising a critical system including a display.

The present invention also relates to an electronic security device and a computer program product related to this method.

In a manner known per se, a vehicle comprises a steering aid system with a screen for displaying images to inform at least one operator of the vehicle, such as a pilot, co-pilot, navigator or surveillance operator.

In particular, such a system makes it possible to broadcast a video stream, generated via cameras or sensors, and relating to an environment in which the vehicle is moving.

In the automotive sector, for example, display screens are installed in the passenger compartment and are suitable for displaying images in connection with a satellite positioning system or from a vehicle's reversing camera.

In the aeronautical field, such systems exist in the cockpit of an aircraft or in any other command centre, in the form of a screen or in the form of pilot-worn headsets comprising a display. In particular, these systems allow information about the aircraft's environment to be broadcast to the pilot or any other user.

However, when the video stream is corrupted while being generated or while being communicated to the display screens, its display is likely to impede the user and disrupt their operation of the vehicle.

Thus, in the case of a critical manoeuvre, such stream alterations may have serious material and/or human consequences.

It is therefore an object of the invention to provide a method for securing a vehicle comprising a critical system including a display, by controlling the brightness of the display.

To this end, the object of the invention is a method of securing a vehicle comprising a critical system including a display, the method comprising the following steps:
- acquisition of at least one video stream to be shown on the display;
- calculation of a brightness level of the or each video stream;
- if the brightness level of the video stream(s) meets a predefined criterion, then displaying (160) the video stream on the display;
- otherwise, inhibiting of displaying the video stream.

In other beneficial aspects of the invention, the method for securing comprises one or more of the following features, taken in isolation or in any technically possible combination:
- inhibiting the step of displaying the video stream includes replacing the video stream with an error message, an error icon or a black screen, or turning off the display,
- the acquisition step comprises the acquisition of a first video stream and a second video stream, the method further comprising a step of mixing the first and second video streams before displaying them on the display,
- inhibiting of displaying the video stream is specific to each video stream; if one of the video streams does not meet the criterion, then the method comprises, prior to the mixing step, an inhibition of the video stream,
- the or at least one of the video streams is generated by the critical system from content to be shown, the brightness level of this video stream meeting the predefined criterion if this brightness level is below a threshold associated with this video stream, the threshold associated with this video stream being determined from the content, the threshold associated with this video stream preferably being determined from a worst-case scenario in which the brightness level associated with this content is the highest,
- the brightness level of the or at least one of the video streams meets the predefined criterion if that brightness level is below a threshold associated with that video stream, the threshold associated with that video stream being determined prior to the method, the threshold preferably being related to a maximum acceptable to a user,
- the brightness level of the or each video stream meets the predefined criterion if this brightness level is less than a threshold associated with this video stream and determined from a predefined maximum brightness level, the threshold advantageously being determined moreover on the basis of data from a sensor relating to at least one corner of the display in a predefined reference frame,
- the threshold associated with the or at least one of the video streams is determined as a percentage of the maximum brightness level,
- the steps of the method are repeated at a predetermined frequency, and
- the brightness level for each video stream is calculated as a grey level of that stream.

The invention further relates to a computer program product comprising software instructions, which, when carried out by a computing device, implement the method for securing as defined above.

The invention further relates to a security device comprising technical means adapted to implement the method for securing, as defined above.

These characteristics and advantages of the invention will become apparent upon reading the following description, given as a nonlimiting example, referring to the attached drawings, in which.

Figure 1:
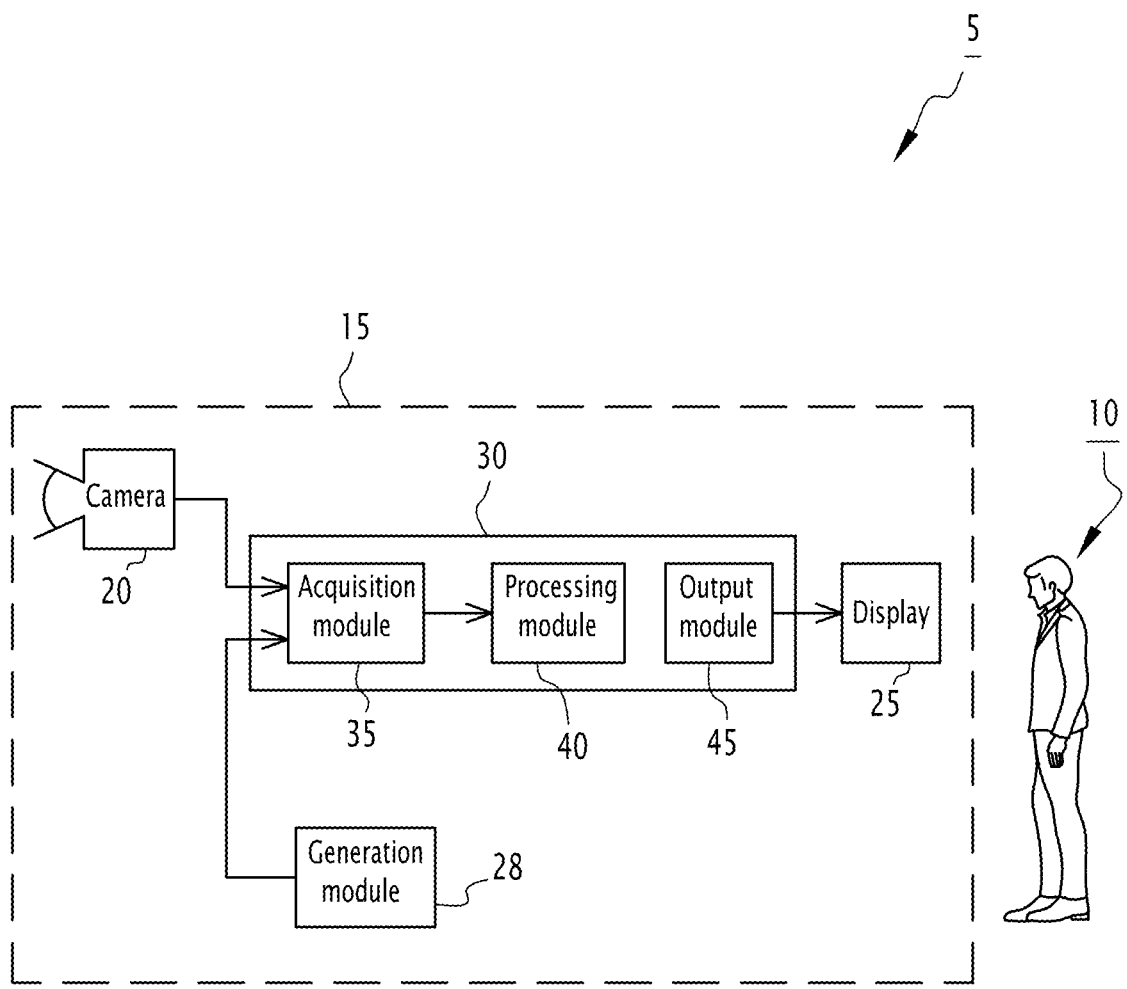
FIG. 1 is a schematic view of an electronic security device, in a critical system, according to the invention.

With reference to FIG. 1, a vehicle 5 is mobile in an environment. The vehicle 5 is for example an aircraft, a railway vehicle, a marine vehicle or a road vehicle. The vehicle 5 is controlled by a user 10 on board (e.g. from a cockpit in the case of an aeroplane or helicopter) or remotely from it (e.g. from a ground control centre in the case of a drone).

The vehicle 5 comprises a critical system 15 configured to communicate information to the user 10.

When the critical system 15 is on board the vehicle 5, it is said to be embedded. When the critical system 15 is outside said vehicle 5, it is said to be remote. Such a remote critical system 15 is particularly useful when the vehicle 5 is a drone.

In a preferred embodiment, the critical system 15 is carried on board the vehicle 5.

The critical system 15 comprises a camera 20, a display 25, a generation module 28 and a device 30 for securing the vehicle 5.

If the critical system 15 is remote from the vehicle 5, then it does not comprise the camera 20 but is able to communicate with a respective camera 20 on board the vehicle 5.

The critical system 15 is for example connected, via its generation module, to sensors not shown, or to an on-board computer not shown, capable of transmitting data to the critical system 15 on the vehicle 5 as well as on the environment in which it is moving. The data are for example related to the external pressure, a quantity of fuel in the vehicle 5, an external temperature, or a speed of the vehicle 5.

The camera 20 for example is located outside the vehicle 5. The camera 20 is configured to capture images of the environment of the vehicle 5, forming a first video stream. The camera 20 is for example located upstream of the vehicle 5, in the direction of travel of the vehicle 5, to capture images of the environment that the vehicle 5 will soon encounter. The camera defines an optical axis along which it points.

Alternatively, instead of the camera 20, the system 15 comprises any other device capable of providing images forming the first video stream.

The display 25 is, for example, a headset with display screens (not shown) and image diffusion means (not shown) such as a screen or projection surface and a projector. Alternatively, the display 25 is a screen located in a passenger compartment of the vehicle 5, where the user 10 is positioned.

In a variant not shown, when the display 25 is a headset, the critical system 15 further comprises a posture sensor of the user 10. The posture sensor is configured to provide the securing device 30 with data relating to the posture of the user's 10 head. This data is used to define an angle in a predefined reference frame. In particular, this data defines an angle between a plane of the display 25 and the optical axis along which the camera 20 points.

The generation module 28 is configured to generate a second video stream. The second video stream contains, for example, symbology representing data from the sensors or the on-board computer, to which the generation module 28 is connected.

In a variant not shown and in case the second stream is composed of symbology, the generation module 28 is comprised in the security device 30. Thus the generation module 28 is also configured to communicate to the security device 30 data relating to the symbols it is able to generate in the second stream. More particularly, the generation module 28 is configured to communicate to the security device 30 the state of the second stream in the event that it comprises the set of symbols that the generation module 28 is able to generate. Such a state of the second stream is referred to as the "worst case" in the remainder of the description.

The security device 30 is configured to transmit a video stream, hereafter referred to as a mixed video stream, to the display 25. The security device 30 comprises an acquisition module 35, a processing module 40 and an output module 45.

The acquisition module 35 is configured to acquire a plurality of video streams. This acquisition module is for example configured to acquire the first video stream from the camera 20 and a second video stream from the generation module 28. As an optional addition, the acquisition module 35 is configured to further acquire information relating to a content of the second video stream from the generation module 28.

According to the variant in which the critical system 15 comprises the posture sensor, the acquisition module 35 is also configured to receive data relating to the posture of the user 10.

The processing module 40 is configured to process the video streams acquired by the acquisition module 35 and to produce the mixed video stream.

The output module 45 is configured to communicate the mixed video stream from the processing module 40 to the display 25.

According to one embodiment, the acquisition module 35, the processing module 40 and the output module 45 are each implemented as software stored in one or more storage means (such as a hard disk or a flash disk) and implemented by one or more processors, memory (RAM) and other computer components known per se. These components are then included in the same computer or in different computers/servers. In the latter case, the computers/servers are connected by a local or global network.

In addition, or alternatively, at least some of these modules 35, 40 and 45 take the form, at least in part, of an independent electronic component, such as a Field Programmable Gate Array (FPGA) or similar programmable logic circuit.

Figure 2:
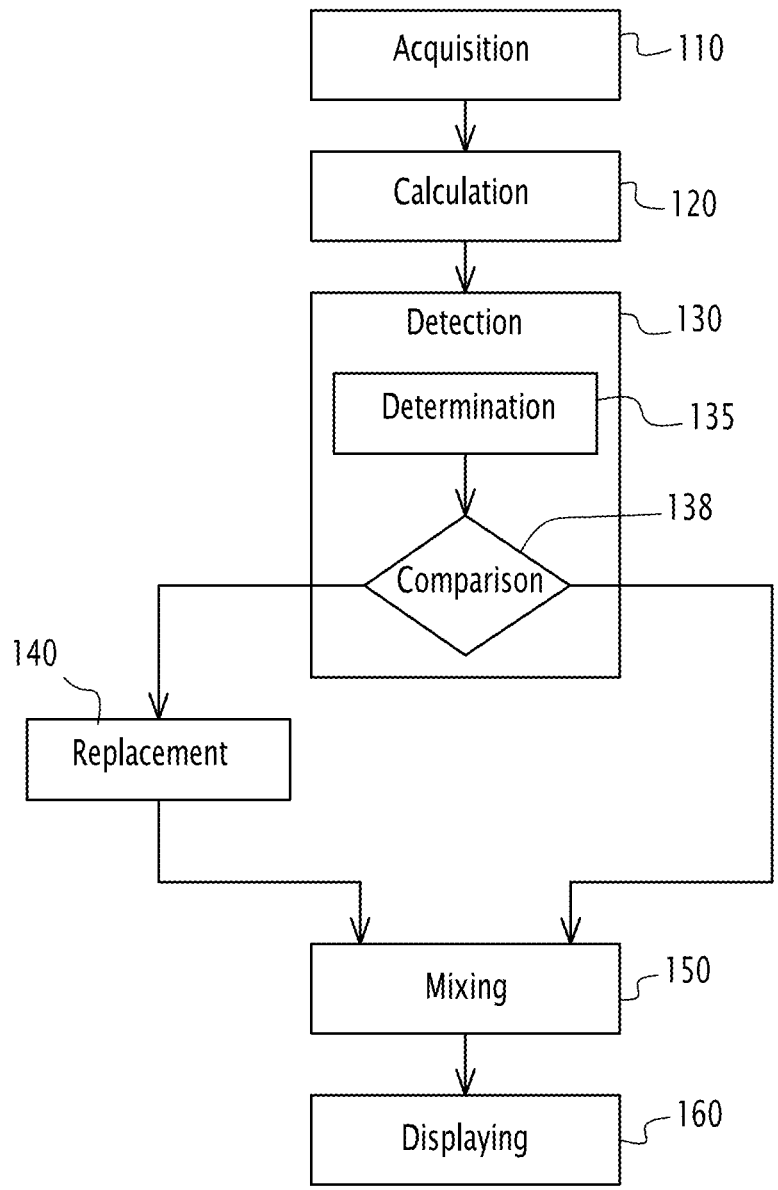
FIG. 2 is a flowchart of a method for securing implemented by the security device of FIG. 1.

The method for securing implemented by the electronic security device 30 according to the invention will now be explained with reference to FIG. 2, which shows a flowchart of its steps.

Initially, the vehicle 5 moves in the environment, piloted by the user 10. The camera 20 then acquires images of the environment, generating a first video stream, and the generation module 28 generates a second video stream from data from sensors and/or an onboard computer.

In a first acquisition step 110, the acquisition module 35 acquires the first video stream from the camera 20 or other similar device and the second video stream from the generation module 28. During this acquisition step 110, the acquisition module 35 also acquires information relating to the content of the second video stream from the generation module 28.

As an optional addition, when the display 25 is a headset and when the critical system 30 comprises the sensor, the acquisition module 110 further acquires, in the acquisition step 110, data relating to the posture of the user 10.

In a calculation step 120, the processing module 40 calculates a brightness level of each video stream. For this purpose, the processing module 40 calculates a grey level for each stream. The calculation of the grey level is carried out, for example, according to a technique known per se, by a weighted average over all the pixels, of the red, blue and green coefficients (RGB) and advantageously of a transparency coefficient, called the alpha coefficient.

As an optional addition, when the display 25 is a headset and when the critical system 15 comprises the sensor, in the calculation step 120, the processing module 40 processes the first stream from the data relating to the posture of the user 10. Upon completion of the calculation step 120, each image of the first video stream comprises either entirely an image of the first acquired video stream, or a first portion corresponding to the image of the first acquired video stream and a second black portion.

In this optional addition, during the calculation step 120 the processing module 40 calculates the average grey level of the first video stream only from the first portion corresponding to the acquired first video stream.

In a detection step 130, the processing module 40 detects, for each video stream, whether its brightness level is above a corresponding threshold. Specifically, the processing module 40 detects whether the brightness level of the first stream, known as the first brightness level, is above a first threshold and/or whether the brightness level of the second stream, known as the second brightness level, is above a second threshold.

To this end, in a determination substep 135 the processing module 40 determines the first threshold from a predefined maximum brightness level. For example, the processing module 40 determines the first threshold as a percentage of the maximum brightness level. The first threshold is, for example, between 60% and 80% of the maximum brightness level and preferably 70% of the maximum brightness level.

Alternatively, the first threshold is determined, prior to the method for securing, as a percentage of the maximum light level.

Alternatively, if the camera 20 is configured to additionally communicate information relating to its maximum settings to the method for securing 30, such as its maximum contrast enhancement, then the first threshold is equal to this information relating to the settings of the camera 20.

Alternatively, when the critical system includes the posture sensor, the processing module 40 determines the first threshold based on the data from the posture sensor.

Also in the determination substep 135, the processing module 40 determines the second threshold from the maximum brightness level and the information acquired about the content of the second video stream.

Specifically, the processing module 40 then determines the second threshold as a percentage of the maximum brightness depending on the content of the second video stream. For example, if the content of the second video stream is substantially discrete symbology in a corner of the display screen, the second threshold is lower than if the content of the second video stream is composed of a multitude of symbols filling the entire display screen. Advantageously, the second threshold evolves dynamically with the content, between 30% and 50% of the maximum brightness level.

Alternatively, when the generation module 28 is part of the security device 30, the processing module 40 determines the second threshold in relation to the worst case of the second stream described above. This ensures that the generation module can generate the second stream comprising the set of symbols it is configured to generate. In such a situation, the grey level of the second stream is higher than the second threshold only if an error occurs in the generating of the second stream or in the communication between the generation module 28 and the acquisition module 35.

Alternatively, the processing module 40 is configured to determine the second threshold as being constant and independent of the generation module 28. The second threshold is then, for example, 30% of the maximum brightness level of the display 25.

Alternatively again, the second threshold is determined prior to the method. In such a case, the second threshold is for example determined by human factor analysis during the development of the function and is related to the operational maximum acceptable to the user 10 depending on the typology of the second video stream (symbology, visible sensor image, IR sensor image, or others).

In a comparison substep 138, the processing module 40 compares the brightness level of each video stream with the corresponding threshold.

If the brightness level of at least one of the video streams is greater than its associated threshold, the processing module 40 enters a replacement step 140. Such a stream is referred to hereafter as a corrupted stream.

More particularly, the brightness level of the first stream is likely to exceed the first threshold if an error occurs between the image capture by the camera 20 and the acquisition 110 of the first stream by the acquisition module 35, leading to the production of a white image, or if the camera 20 captures images that are naturally too bright, or if the user 10 has made an adjustment to the display 25 leading to an image that is too bright to display.

Similarly, the brightness level of the second stream is likely to exceed the second threshold in the event of a communication error between the generation module 28 and the acquisition module 35, or in the event of an error in the generation module 28 when generating the second stream.

During the replacement step 140, the processing module 40 replaces the corrupted stream with its own error message. Thus, if the corrupted stream is the first stream, the module 40 replaces the first stream with a first error message. Likewise, if the corrupted stream is the second stream, then the processing module 40 replaces the second stream with a second error message. The first error message is, for example, a message indicating that the images from the camera are corrupted. In another example, the first error message is a message indicating that the brightness level of the first video stream is above the first threshold.

The second error message is, for example, a message indicating that the video stream from the generation module 28 is corrupted. In another example, the second error message is a message indicating that the brightness level of the second video stream is above the second threshold.

Following the replacement step 140 or at the detection step 130 if the brightness level of neither stream is above the corresponding threshold, the processing module 40 proceeds to a mixing step 150 in which it produces the mixed video stream.

During this mixing step 150, the processing module 40 mixes the first and second video streams using a known technique. If one of the two video streams has been replaced by an error message in the replacement step 140, then the processing module 40 performs the mixing of this error message and the non-corrupted video stream.

In a display step 160, the output module 45 transmits the mixed video stream to the display 25 for display on the display screen.

The calculation 120, detection 130, and if necessary replacement 140 steps are repeated at a predetermined frequency, for example 100 Hz.

With the method according to the invention, the corruption of at least one video stream is detected prior to its display. Thus, the method for securing the vehicle 5 according to the invention prevents the user 10 from being impeded by a corruption of the video stream while piloting. Indeed, when the brightness level of one of the video streams is too high, the method according to the invention detects it and displays an error message instead of that stream.

In addition, the error message replacing the corrupted video stream alerts the user 10 to a problem with the equipment generating the video stream.

Furthermore, the fact that the mixing step 150 is subsequent to the replacement step 140 when one of the video streams is corrupted, allows the user 10 to continue receiving information from the other video stream while being informed of the alteration.

The invention claimed is:

1. An electronic security device of a critical system of a vehicle, said critical system comprising a display, said electronic security device comprising:
   an acquisition module configured to acquire a plurality of video streams;
   a processing module configured to process the video streams acquired by the acquisition module and to produce a mixed video stream, and which:
   calculates a brightness level of each video stream;
   detects, for each video stream, whether its brightness level is above a corresponding threshold;
   replaces, for each video stream comprising a brightness level greater than its corresponding threshold, the video stream with its own error message;
   produces said mixed video stream comprising the video streams with a brightness level below their corresponding threshold and the error messages; and
   an output module, configured to communicate the mixed video stream from the processing module to the display.

2. The device according to claim 1, wherein the processing module replaces a video stream comprising a brightness level greater than its corresponding threshold with an error icon or a black screen or a command for turning off the display.

3. The device according to claim 1, wherein the acquisition module is configured to acquire a first video stream and a second video stream, and the processing module is configured to mix the first and second video streams before displaying them on the display.

4. The device according to claim 1, wherein said plurality of video streams are generated by said critical system from content to be shown, the threshold associated with each video stream being determined from the content.

5. The device according to claim 4, wherein the threshold associated with each video stream content is determined from a worst-case scenario in which the brightness level associated with the content is a highest.

6. The device according to claim 1, wherein the threshold associated with each video stream is predetermined.

7. The device according to claim 6, wherein the predetermined threshold associated with each video stream is related to a maximum acceptable to a user.

8. The device according to claim 1, wherein the threshold associated with each video stream is determined from a predefined maximum brightness level.

9. The device according to claim 8, wherein the threshold associated with each video stream is determined as a percentage of the predefined maximum brightness level.

10. The device according to claim 8, wherein the threshold associated with each video stream is determined on a basis of data from a sensor relating to at least one corner of the display in a predefined reference frame.

11. The device according to claim 1, wherein the acquisition module is further configured to acquire a plurality of video streams periodically with a predetermined frequency.

12. The device according to claim 1, wherein the brightness level of each video stream is calculated as a grey level of that stream.

* * * * *